(12) United States Patent
Rosik et al.

(10) Patent No.: US 8,704,484 B2
(45) Date of Patent: Apr. 22, 2014

(54) TEMPERATURE SENSOR INTERFACE FOR WIRELESS AND WIRED CHARGING

(75) Inventors: Raymond K. Rosik, San Diego, CA (US); Pengfei Li, San Diego, CA (US); Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 12/959,253

(22) Filed: Dec. 2, 2010

(65) Prior Publication Data

US 2011/0291613 A1  Dec. 1, 2011

Related U.S. Application Data

(60) Provisional application No. 61/349,734, filed on May 28, 2010.

(51) Int. Cl.
*H02J 7/00* (2006.01)

(52) U.S. Cl.
USPC .......................................... 320/108; 320/150

(58) Field of Classification Search
USPC ....................................................... 320/108
See application file for complete search history.

(56) References Cited

U.S. PATENT DOCUMENTS

| | | | | |
|---|---|---|---|---|
| 4,784,319 A * | 11/1988 | Kaiser | ........................ | 236/46 R |
| 5,536,979 A * | 7/1996 | McEachern et al. | .......... | 307/104 |
| 5,821,731 A * | 10/1998 | Kuki et al. | .................... | 320/108 |
| 6,016,046 A * | 1/2000 | Kaite et al. | .................... | 320/108 |
| 6,184,651 B1 * | 2/2001 | Fernandez et al. | ............ | 320/108 |
| 7,253,589 B1 | 8/2007 | Potanin et al. | | |
| 7,453,239 B2 * | 11/2008 | Suzuki | .......................... | 320/152 |
| 7,952,322 B2 * | 5/2011 | Partovi et al. | ................. | 320/108 |
| 2001/0000212 A1 * | 4/2001 | Reipur et al. | ................. | 320/104 |
| 2002/0089305 A1 * | 7/2002 | Park et al. | ..................... | 320/108 |
| 2004/0066169 A1 * | 4/2004 | Bruning | ........................ | 320/108 |
| 2005/0110462 A1 | 5/2005 | Ullrich et al. | | |
| 2006/0007622 A1 * | 1/2006 | Furukawa et al. | ............ | 361/115 |
| 2006/0061325 A1 * | 3/2006 | Tang et al. | ..................... | 320/108 |
| 2006/0103355 A1 * | 5/2006 | Patino et al. | ................... | 320/138 |
| 2006/0244420 A1 * | 11/2006 | Stanesti et al. | ................ | 320/128 |
| 2007/0018780 A1 * | 1/2007 | Furukawa et al. | ............ | 338/104 |
| 2008/0180300 A1 * | 7/2008 | Jeong et al. | .................... | 341/166 |
| 2009/0124299 A1 * | 5/2009 | Suzuki et al. | .................. | 455/573 |
| 2010/0013432 A1 * | 1/2010 | Toya et al. | ..................... | 320/108 |
| 2010/0295505 A1 * | 11/2010 | Jung et al. | ..................... | 320/108 |
| 2012/0229084 A1 * | 9/2012 | Gu | ................................. | 320/108 |

FOREIGN PATENT DOCUMENTS

WO   WO2004088816 A1   10/2004

OTHER PUBLICATIONS

International Search Report and Written Opinion—PCT/US2011/038252—ISA/EPO—Mar. 2, 2012.

* cited by examiner

*Primary Examiner* — Arun Williams
(74) *Attorney, Agent, or Firm* — Knobbe, Martens, Olson & Bear LLP

(57) ABSTRACT

Exemplary embodiments are directed to an electronic device for enabling a temperature of a battery unit to be sensed with a wired power charger or a wireless power. A device may include a wireless power receiver and a wired charging module operably coupled to the wireless power receiver. The device may also include an interface configured to couple to a battery unit and for selectively enabling one of the wireless power receiver and the wired charging module to determine a temperature of the battery unit.

25 Claims, 9 Drawing Sheets

TEMPERATURE SENSOR INTERFACE FOR WIRELESS AND WIRED CHARGING

CLAIM OF PRIORITY UNDER 35 U.S.C. §119

This application claims priority under 35 U.S.C. §119(e) to:

U.S. Provisional Patent Application 61/349,734 entitled "SHARED BATTERY THERMISTOR INTERFACE FOR WIRELESS CHARGING" filed on May 28, 2010, the disclosure of which is hereby incorporated by reference in its entirety.

BACKGROUND

1. Field

The present invention relates generally to wireless power, and more specifically, to systems, device, and methods related to an interface for monitoring a battery temperature in both wired and wireless charging applications.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

Prior to receiving a charge, a temperature of a battery within an electronic device must be monitored to ensure that the temperature is within a safe window. Typically, this is done with a thermistor, which is positioned either in a battery pack or proximate the battery pack. Co-existence of a wired charging module and wireless charging receiver within an electronic device has proven to be challenging.

A need exists for methods, systems, and devices for interfacing a single thermistor within an electronic device to a wired charging module and a wireless charging receiver while maintaining a high degree of temperature sensing accuracy.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors.

Figure 1:
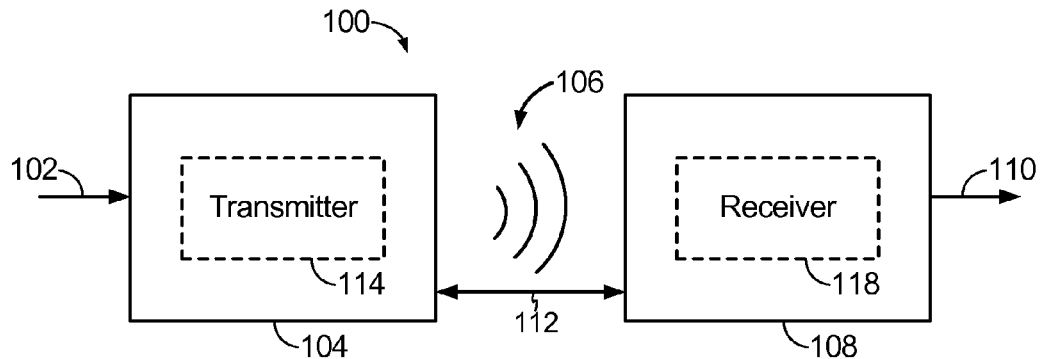
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
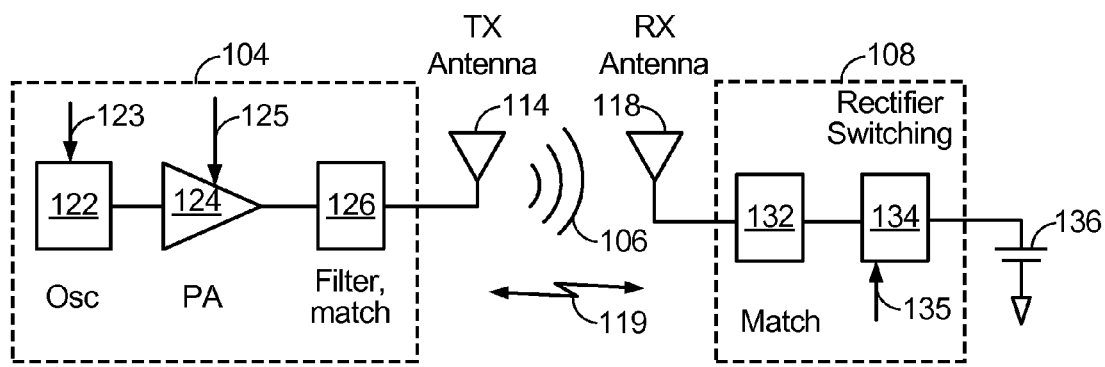
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, such as 468.75 KHz, 6.78 MHz or 13.56, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
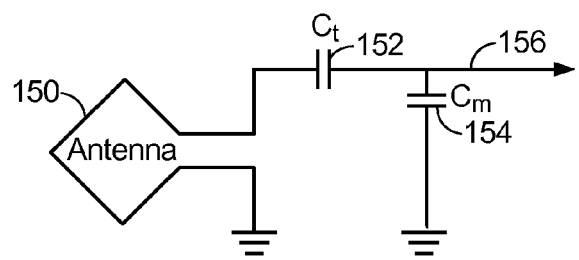
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
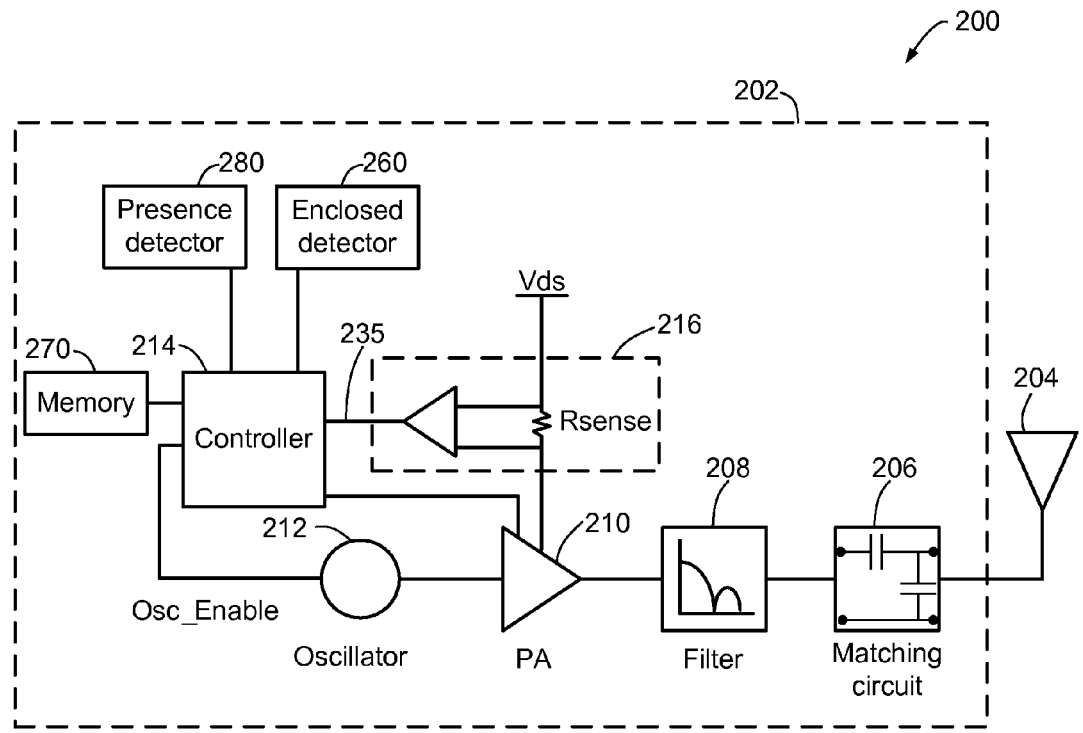
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
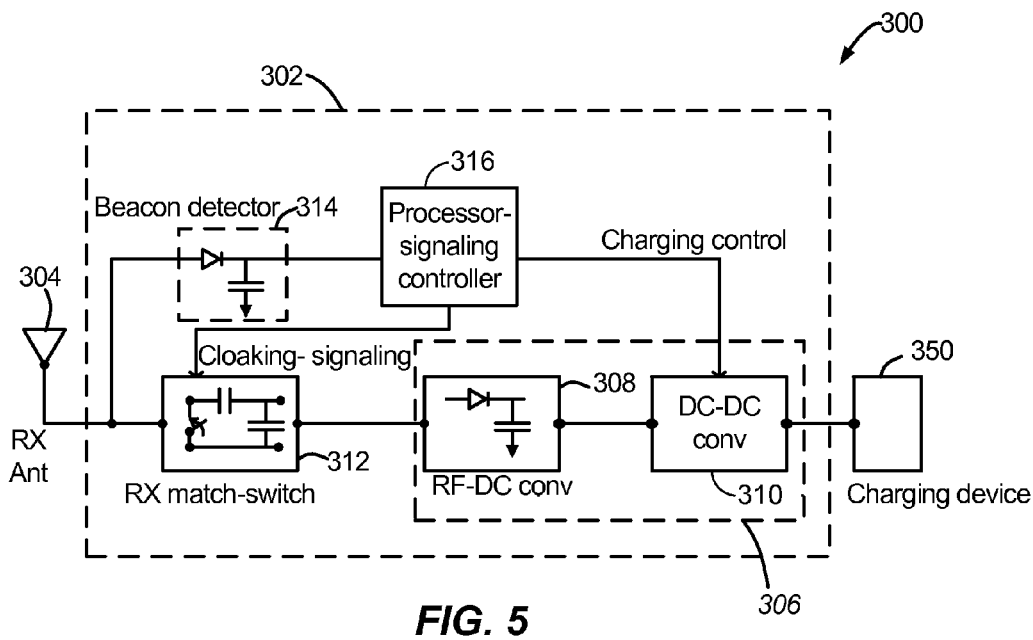
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
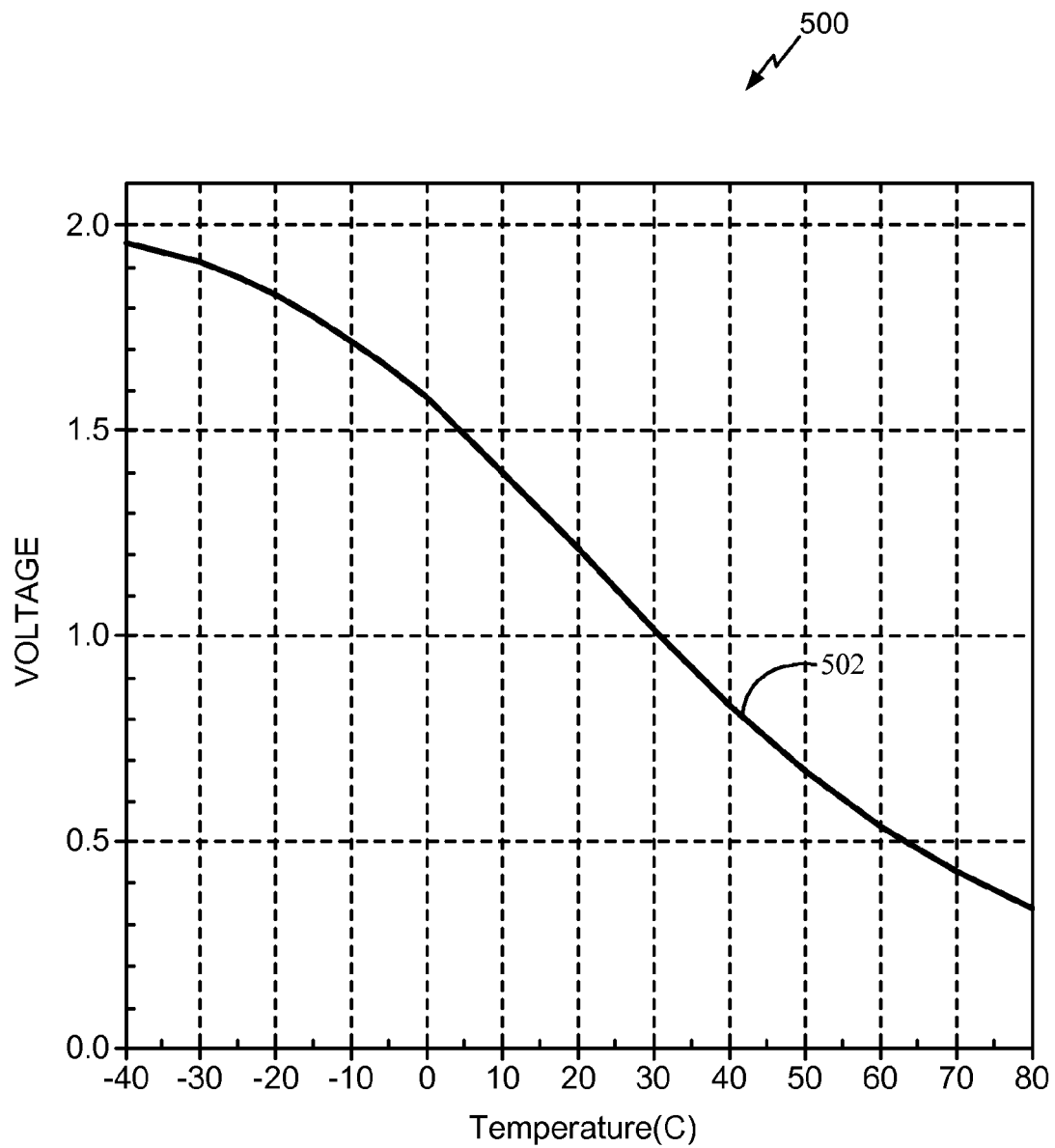
FIG. 6 is a plot illustrating temperature versus voltage of a battery thermistor within a resistive divider.
Figure 7:
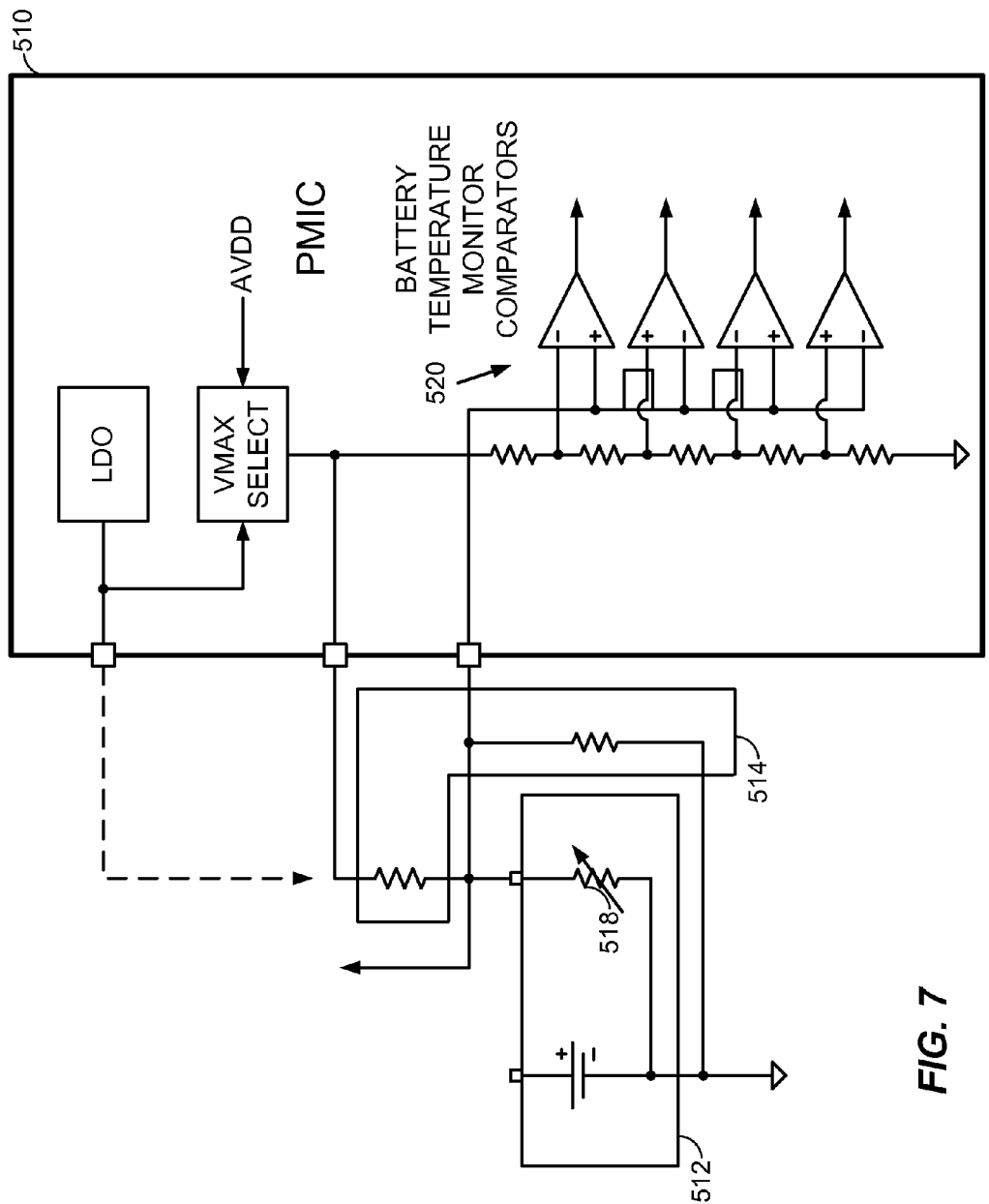
FIG. 7 is a conventional thermistor bias monitoring circuit.

As will be appreciated by a person having ordinary skill in the art, a charging module within an electronic device may utilize a thermistor to sense a battery temperature and to confirm a temperature of the battery is within a safe window before charging the battery. The safe temperature window is typically 0 to 60 degrees Celsius. The thermistor may either be embedded in a battery unit (i.e., a battery pack) or may be externally located in close proximity to the battery unit. As will be understood by a person having ordinary skill in the art, thermistor resistance has a negative temperature coefficient and drops with a non-linear slope as temperature increases as shown by signal 502 in plot 500 of FIG. 6. FIG. 7 depicts a conventional wired charging module within a power management integrated circuit (PMIC) 510 coupled to a battery 512 via a resistor divider 514, which is used to sense a thermistor resistance. A charging device, such as a PMIC 510 or a wireless charging module, may supply a bias voltage to resistive divider 514 and, thereafter, measure the voltage drop across a thermistor 518, which correlates to battery temperature. Sensing for the temperature can be implemented either with an array of comparators 520, as shown in FIG. 7, or by sampling with an analog-to-digital converter. PMIC 510 is well known in the art and, therefore, will not be described in further detail.

Various exemplary embodiments of the present invention, as described herein, relate to systems, devices, and methods for enabling a wireless charging receiver and a wired charging module (e.g., a PMIC) within an electronic device to access and utilize a single sensor (e.g., a thermistor) for monitoring a temperature of a battery of the electronic device. It is noted that the exemplary embodiment described herein may enable a wireless charging receiver to coexist in an electronic device with an existing wired charger. Is further noted that a wireless charging receiver may also be referred to herein as a "wireless power receiver."

According to one exemplary embodiment, a wireless charging receiver may be "on" and a wired charging module may be "off" and the wireless charging receiver may provide a bias voltage to a thermistor. According to another exemplary embodiment, the wired charging module may be "on" (i.e., a wired charger is present) and the wireless charging receiver may be "off" and the wired charging module may provide a bias voltage to the thermistor via the wireless charging receiver. According to yet another exemplary embodiment, the wireless charging receiver and the wired charging module may be both "on" and the wired charging module may provide a bias voltage to the thermistor via the wireless charging receiver. It is noted that, according to one exemplary embodiment, a wired charging module may have priority over a wireless charging receiver. Accordingly, in this exemplary embodiment, the wireless charging receiver may be given access to a sensor, such as, a thermistor, only when a bias voltage generated by the wired charging module is nonexistent or below a threshold reference voltage (i.e., the bias voltage generated by the wireless charging receiver).

It is noted that the determination as to whether a wired charger is present may comprise comparing a wired charging bias voltage of the device to a bias voltage internal to a wireless receiver of the device. If the wired charging bias voltage is greater than or equal to the internal bias voltage, a wired charger is present and the device may be in a wired charging mode. If the wired charging bias voltage is less than the internal bias voltage, a wired charger is not present and the device may be in a wireless charging mode.

Figure 8:
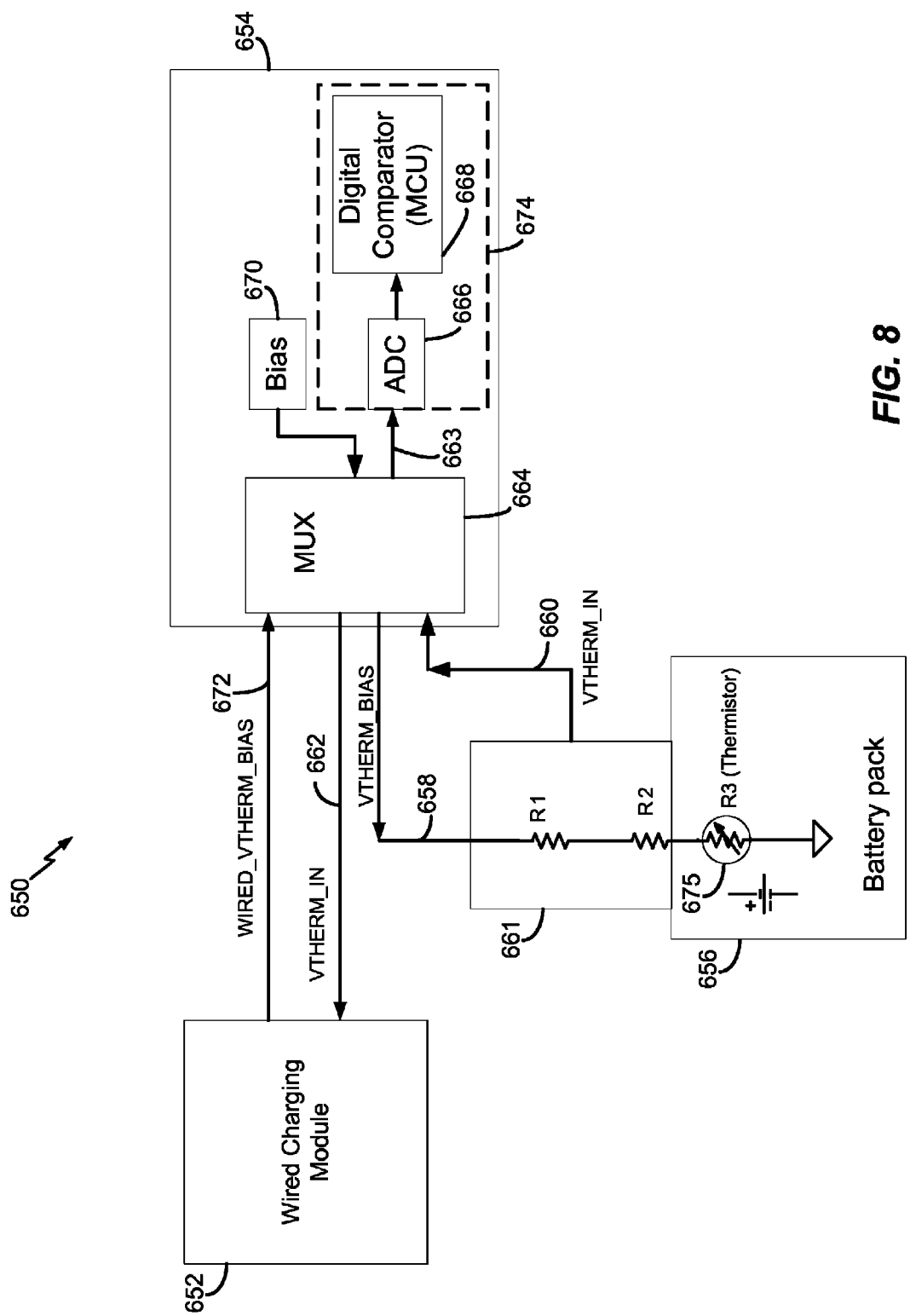
FIG. 8 a block diagram of a portion of a receiver including a wireless power receiver, a wired charging module, and a thermistor, according to an exemplary embodiment of the present invention.

FIG. 8 illustrates a block diagram of a portion of an electronic device 650 including a wired charging module 652 and a wireless charging receiver 654, according to an exemplary embodiment of the present invention. Although it is not required, wired charging module 652 may be within a PMIC. For example only, wired charging module may comprise PMIC 510 illustrated in FIG. 7. Wireless charging receiver 654 may comprise a bias voltage generator 670, which is configured to generate an internal bias voltage, which may also be referred to herein as a reference voltage. Wireless charging receiver 654 may further comprise a multiplexer (MUX) 664, which is configured to receive the internal bias voltage from generator 670. MUX 664 is further configured to receive a bias voltage ("WIRED_VTHERM_BIAS") from wired charging module 652 via link 672. Upon receipt of the internal bias voltage and WIRED_VTHERM_BIAS, MUX 664 may be configured to convey a desired bias voltage VTHERM_BIAS (i.e., either WIRED_VTHERM_BIAS or the internal bias voltage) thermistor 675 via link 658.

Electronic device 650 may further include, or may be coupled to, a battery unit 656. As illustrated, resistor R3 comprises thermistor 675 that is internal to battery unit 656 and resistors R1 and R2 are each external to battery unit 656. Resistor R1, resistor R2, and thermistor R3 make up a voltage divider 661. It is noted that although the exemplary embodiments described herein include a thermistor, the embodiments of the present invention are not so limited. Rather, battery unit 656 may comprise, or may be coupled to, any suitable sensor for sensing a temperature. Voltage divider 661 is configured to output a thermistor voltage VTHERM_IN to MUX 664 via link 660.

As described more fully below, if wired charging module 652 has access to thermistor 675, MUX 664 may convey thermistor voltage VTHERM_IN to wired charging module 652 via a link 662. In response thereto, wired charging module 652 may compare VTHERM_IN with various threshold levels to determine whether a temperature of battery unit 656 is within an acceptable range. On the other hand, if wireless charging receiver has access to thermistor 675, MUX 664 may convey thermistor voltage VTHERM_IN to a module 674 via a link 663. Module 674 is configured for comparing received thermistor voltage VTHERM_IN with various threshold levels to determine whether a temperature of battery unit 656 is within an acceptable range. It is noted that module 674 may also be referred to herein as a "monitoring circuit." Although module 674 is illustrated as comprising an analog-to-digital converter 666 coupled to a digital comparator 668, the embodiments of the present invention are not so limited. Rather, module 674 may be configured for analog operation and may comprise an array of comparators, similar to the array of comparators 520 illustrated in FIG. 7.

According to one exemplary embodiment, as described more fully below, MUX 664 may comprise a plurality of switches for providing VTHERM_BIAS to thermistor 675 and VTHERM_IN to either module 674 or wired charging module 652. According to another exemplary embodiment, MUX 664 may comprise an array of amplifiers for providing VTHERM_BIAS to thermistor 675 and VTHERM_IN to either module 674 or wired charging module 652. It is noted that although MUX 664 is illustrated as being within wireless charging receiver 654, MUX 664 may be external to and operably coupled to wireless charging receiver 654.

A contemplated operation of device 650 will now be described in general. Initially, an internal bias voltage, which is generated by bias voltage generator 670, may be provided to MUX 664. Is it noted that a voltage generated by voltage generator 670 may be scaled before being provided to MUX 664. Furthermore, bias voltage WIRED_VTHERM_BIAS generated by wired charging module 652 may also be provided to MUX 664. After comparing the two bias voltages, MUX 664 may convey the bias voltage having the higher value to thermistor 675 via link 658 as VTHERM_BIAS. It is noted that if WIRED_VTHERM_BIAS is greater than or equal to the internal bias voltage, which is generated by bias voltage generator 670, wired charging module 652 may be given access to thermistor 675 (i.e., WIRED_VTHERM_BIAS is conveyed to thermistor 675 and wired charging module 652 senses a temperature of battery unit 656). This may also be referred to as a "wired charging mode." If WIRED_VTHERM_BIAS is less than the internal bias voltage, which is generated by bias voltage generator 670, wireless charging receiver 654 may be given direct access to bias thermistor 675 (i.e., the bias voltage generated by bias voltage generator 670 is conveyed to thermistor 675 and wireless charging receiver 654 senses a temperature of battery unit 656). This may also be referred to as a "wireless charging mode."

Furthermore, thermistor voltage VTHERM_IN may be provided from resistor divider 661 to MUX 664 via link 660. If wired charging module 652 has been given access to thermistor 675, thermistor voltage VTHERM_IN may be conveyed to wired charging module 652 and compared to threshold voltage levels with an array of comparators 520, as shown in FIG. 7, to determine whether a temperature of battery unit 656 is within an acceptable range. If wireless charging receiver 654 has be given access to thermistor 675, thermistor voltage VTHERM_IN may be conveyed to module 674 for comparing the thermistor voltage with various threshold levels to determine whether a temperature of battery unit 656 is within an acceptable range.

Figure 9:
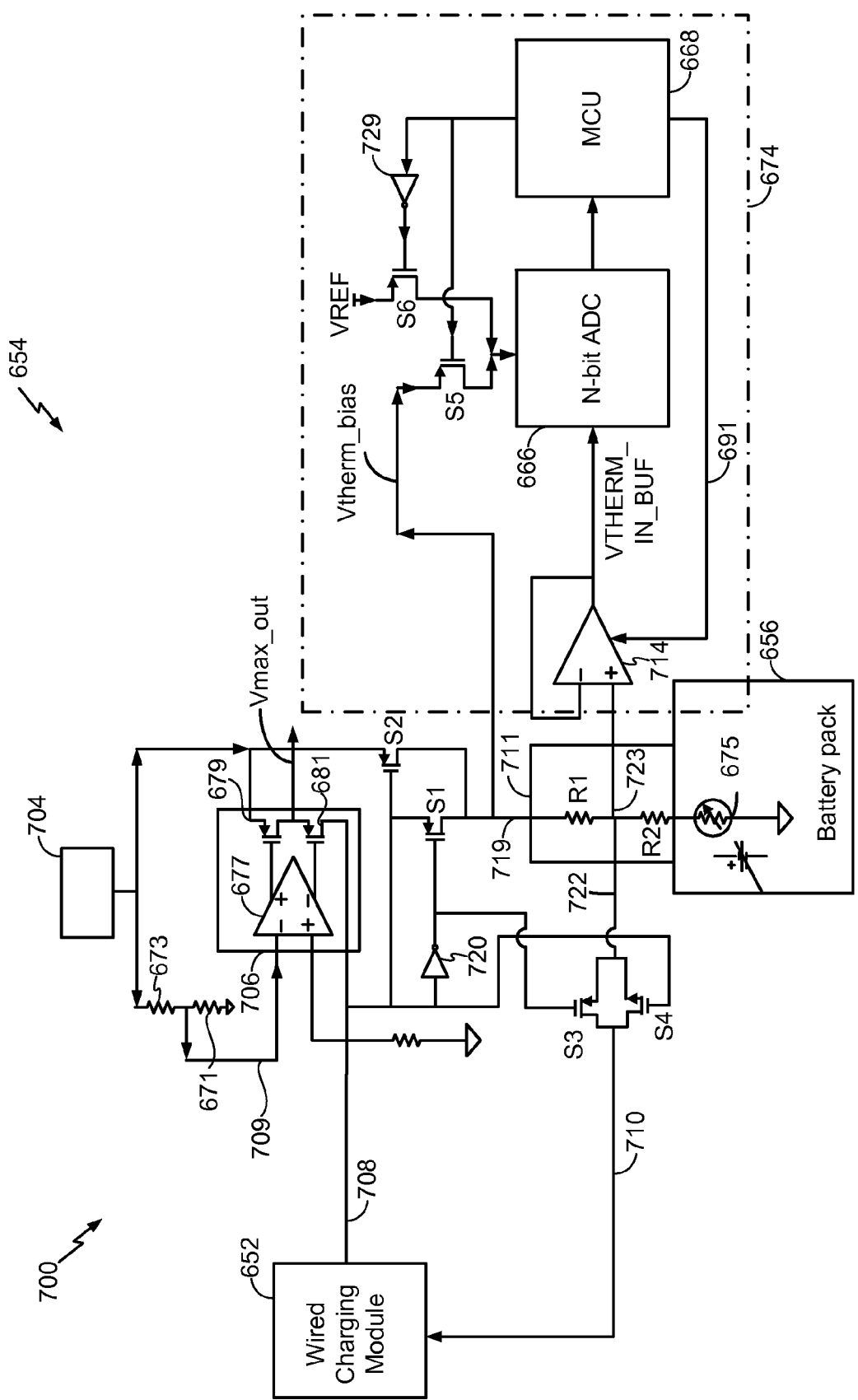
FIG. 9 is a circuit diagram of a portion of a receiver including a wireless power receiver, a wired charging module, and a thermistor, in accordance with an exemplary embodiment of the present invention.

FIG. 9 illustrates a circuit diagram of a portion of an electronic device 700 including wired charging module 652 and wireless charging receiver 654, according to an exemplary embodiment of the present invention. Wired charging module 652 may be configured to convey a bias voltage "WIRED_VTHERM_BIAS" via link 708 and receive a thermistor voltage "VTHERM_IN" via link 710. Furthermore, device 700 may comprise, or may be coupled to, a battery unit 656, which may comprise thermistor 675. Further, as noted above, embodiments of the present invention are not limited to a thermistor, but rather any suitable sensor for sensing temperature may be within the scope of the invention. Device 700 may further include a voltage divider 711 comprising resistor R1, resistor R2, which are each external to battery unit 656, and thermistor 675. Although thermistor 675 is illustrated as being internal to battery unit 656, thermistor may be external to and proximate battery unit 675.

Moreover, device 700 may include a maximum voltage selector 706 and a regulator 704 (e.g., a LDO). Regulator 704 may be configured for supplying an internal bias voltage ("internal bias voltage") to maximum voltage selector 706. Accordingly, maximum voltage selector 706 may be configured to receive, via link 708, the bias voltage WIRED_VTHERM_BIAS from wired charging module 652 and the internal bias voltage from regulator 704, via link 709. Upon receipt of the bias voltages, maximum voltage selector 706 may be configured to define the priority between wireless charging receiver 654 and wired charging module 652. More specifically, maximum voltage selector 706 may enable the bias voltage VTHERM_BIAS to be conveyed to thermistor 675 via link 719. It is noted that the bias voltage VTHERM_BIAS comprises the greater of the bias voltage WIRED_VTHERM_BIAS or the internal bias voltage. Yet even more specifically, if the bias voltage WIRED_VTHERM_BIAS is greater than or equal to the internal bias voltage, wired charging module 652 may be given access to thermistor 675 (i.e., the bias voltage WIRED_VTHERM_BIAS is conveyed to thermistor 675). Moreover, if the bias voltage WIRED_VTHERM_BIAS is greater than or equal to the internal bias voltage, the thermistor voltage VTHERM_IN, which is output from voltage divider 711, may be conveyed to wired charging module via links 722 and 710. Further, if the bias voltage WIRED_VTHERM_BIAS is less than the internal bias voltage, wireless charging receiver 654 may be given direct access to bias thermistor 675 (i.e., the internal bias voltage is conveyed to thermistor 675). Moreover, if the bias voltage WIRED_VTHERM_BIAS is less than the internal bias voltage, the thermistor voltage VTHERM_IN, which is output from voltage divider 711, may be conveyed to module 674 via link 723.

As noted above, wireless charging receiver 654 and, more specifically, MUX 664 (see FIG. 8), may include a plurality of switches for providing a desired bias voltage to thermistor 675. More specifically, wireless charging receiver 654 may comprise switches S1, S2, S3, S4, S5, and S6. Switches S1, S2, S3, and S4, which may be included within MUX 664 of FIG. 8, may provide connections between wired charging module 652, regulator 704, and module 674. Switches S5 and S6 will be described below. It is noted that MUX 664 of FIG. 8, which may comprise switches S1-S4, and maximum voltage selector 706 may together be referred to herein as an "interface."

Device 700 also includes module 674, which, as noted above, may be configured for comparing the thermistor voltage VTHERM_IN with various threshold levels to determine whether a temperature of battery unit 656 is within an acceptable range. In the embodiment illustrated in FIG. 9, module 674 comprises an N-bit analog-to-digital converter 666 with programmable reference switches S5 and S6, a low offset buffer 714, and a microcontroller 668. By way of example only, N-bit analog-to-digital converter 666 may comprise an 8-bit analog-to-digital converter.

Switches S5 and S6 may enable a reference voltage for analog-to-digital converter 666 to be programmable. More specifically, microcontroller 668 may be configured to turn "on" switch S5 during a thermistor channel analog-to-digital converter 666 request (i.e., bias voltage VTHERM_BIAS is used for analog-to-digital converter 666) to match the full scale range of analog-to-digital converter 666 to a buffered thermistor voltage VTHERM_IN_BUF, which is output from buffer 714. This may maximize the resolution of the analog-to-digital converter 666 for enhanced accuracy thermistor voltage measurements with minimum resolution for analog-to-digital converter 666. For all other channel conversion requests, microcontroller 668 may turn "off" switch S5 and turn "on" switch S6 to use internal reference voltage Vref for the analog-to-digital converter 666.

A temperature of battery unit 656 is sampled with an analog-to-digital converter conversion request from microcontroller 668 and compared to predefined thresholds. Microcontroller 668 may then use the results of the comparison to validate that a temperature of battery unit 656 is within a safe window for charging. It is noted that buffer 714 may be configured to isolate the input impedance of analog-to-digital converter 666 from the external thermistor resistor divider 711. This may enable faster conversion time and may prevent accuracy penalties due to input analog-to-digital converter input impedance changes during a conversion.

A contemplated operation of device 700 will now be described. Initially, an internal bias voltage, which is generated from regulator 704, may be scaled by a resistor divider, which comprises resistors 673 and 671. The scaled bias voltage ("internal bias voltage") may then be provided to an input of maximum voltage selector 706, which may comprise a comparator 677 and switches 679 and 681. By way of example only, the internal bias voltage may be scaled by 20%. Stated another way, the scaled bias voltage provided to maximum voltage selector 706 may be 80% of the voltage generated by regulator 704. Moreover, a bias voltage from wired charging module 652 ("WIRED_VTHERM_BIAS") may also be conveyed to the input of maximum voltage selector 706 via link 708. Thereafter, the internal bias voltage and the bias voltage WIRED_VTHERM_BIAS may be compared by maximum voltage selector 706. It is noted that scaling the bias voltage generated by regulator 704 may prevent a condition wherein the bias voltage WIRED_VTHERM_BIAS is equal to the internal bias voltage. This can undesirably result in oscillations and or high leakage currents through maximum voltage selector 706.

Maximum voltage selector 706 may be configured to open switch S2 and close switches S1, S3, and S4 when the bias voltage WIRED_VTHERM_BIAS is greater than or equal to the internal bias voltage. Therefore, when bias voltage WIRED_VTHERM_BIAS is greater than or equal to the internal bias voltage, wired charging module 652 is given direct access to bias thermistor 675. Stated another way, wired charging module may bias thermistor 675 and sense the temperature of battery unit 656.

Furthermore, maximum voltage selector 706 may be configured to close switch S2 and open switches S1, S3, and S4 when the bias voltage WIRED_VTHERM_BIAS is less than the internal bias voltage. Therefore, when the bias voltage WIRED_VTHERM_BIAS is less than the internal bias voltage, wired charging receiver 654 is given direct access to bias thermistor 675. Stated another way, wired charging receiver 654 may bias thermistor 675 and sense the temperature of battery unit 656.

As noted above, microcontroller 668 may be configured to turn "on" switch S5 during a thermistor channel analog-to-digital converter request to match the full scale range of analog-to-digital converter 666 to a buffered thermistor voltage VTHERM_IN_BUF, which is output from buffer 714. For all other channel conversion requests, microcontroller 668 may turn "off" switch S5 and turn "on" switch S6 to use internal reference voltage Vref for analog-to-digital converter 666.

It is noted that a voltage Vmax_out, which is an output of maximum voltage selector 706, may be used as a supply for inverter 720 and bulk connections of switches S1-S4. Accordingly, wireless charging receiver 654 may be functional even when an associated chargeable device is not on a charging pad and has no input supply other than wired charging bias voltage. In an example wherein wired charging module 652 and the wired charging bias voltage are not present, maximum voltage selector 540 may close switch S2 and open switches S1, S3, and S4. The internal bias voltage biases thermistor 675 from regulator 704 and disconnects link 710 from link 722.

Figure 10:
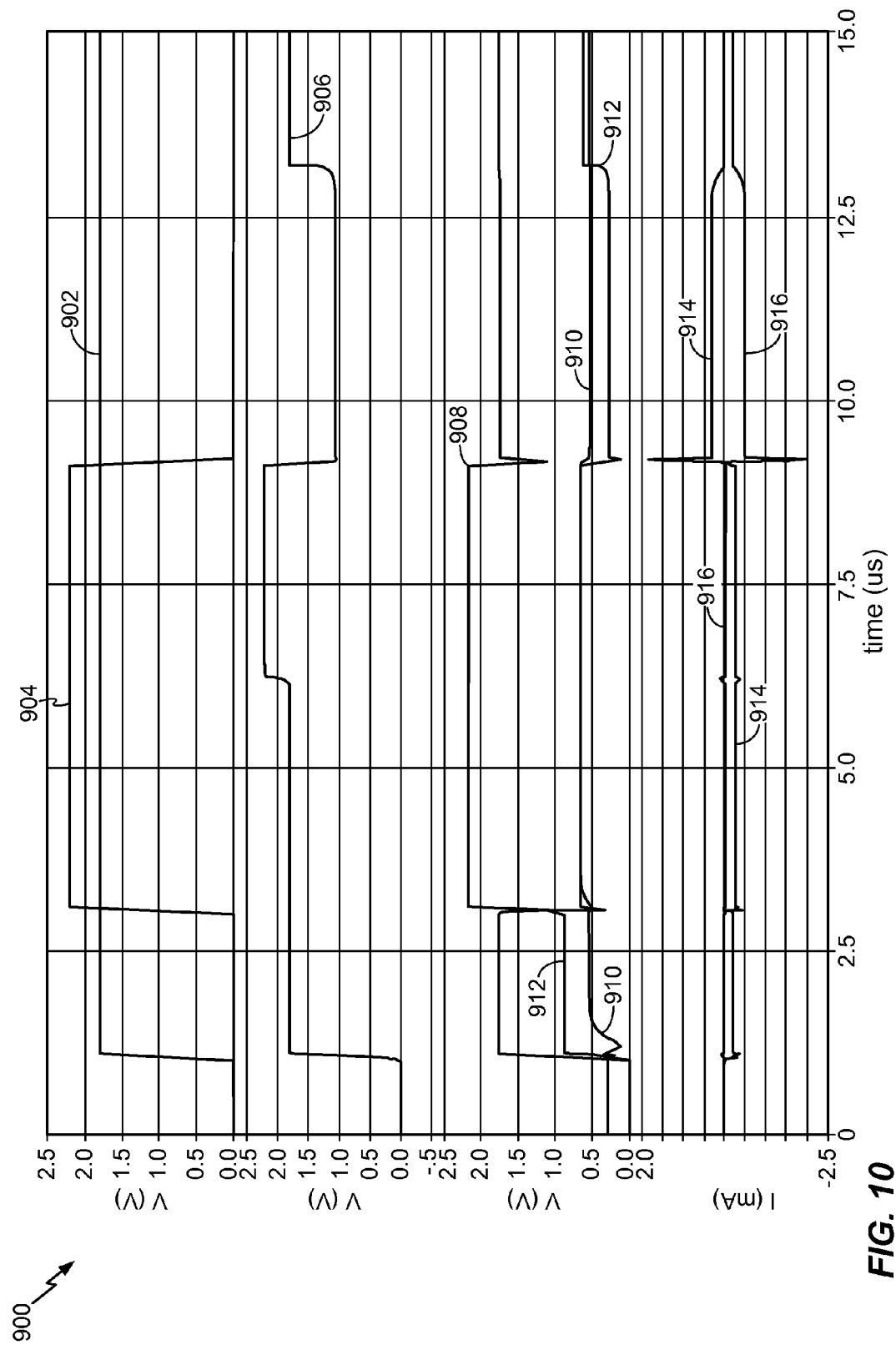
FIG. 10 is a timing diagram illustrating various voltage and currents within a receiver, according to an exemplary embodiment of the present invention.

FIG. 10 illustrates a timing diagram 900 illustrating various current and voltage levels of device 700 for the use case sequence in which a wireless charging receiver (e.g., wireless charging receiver 654) is on and a wired charging module (e.g., wired charging module 652) toggles between an on and off position. Timing diagram 900 illustrates an automatic priority assignment of the interface (i.e., MUX 664 and maximum voltage selector 706). It is noted that timing diagram 900 depicts an operation in which a wireless charging receiver (e.g., wireless charging receiver 654) is on and a wired charging module (e.g., wired charging module 652) toggles between an on and off position. With reference to FIGS. 9 and 10, timing diagram 900 will now be described. Signal 902 represents a voltage level of the internal bias voltage and signal 904 represent a voltage level of the wired charging bias voltage ("WIRED_VTHERM_BIAS"). Further, signal 906 represents a voltage level of voltage Vmax_out. Signal 908 represents a voltage level of the bias voltage ("VTHERM_BIAS") conveyed to thermistor 675.

Signal 912 represents a voltage level of the thermistor voltage ("VTHERM_IN") conveyed to wired charging module 652 via link 710 and signal 910 represents a voltage level ("VTHERM_IN_BUF") output from buffer 714. Furthermore, signal 914 represents a current level supplied from regulator 704 to maximum voltage selector 706 and signal 916 represent a current level supplied from wired charging module 652 to maximum voltage selector 706. It is noted that when wired charging module 652 is on and the wired charging bias voltage (i.e., signal 904) is at 1.8 volts, Vmax_out (i.e., signal 906) is also at 1.8V. Once the wired charging bias voltage (i.e., signal 904) turns on and is higher than internal bias voltage (i.e., signal 902) (i.e., 2.2V>1.8V), Vmax_out (i.e., signal 906) and the VTHERM_BIAS (i.e., signal 908) are connected to the wired charging bias voltage at 2.2V. Wired charging bias voltage (i.e., signal 904) is then turned off. Vmax_out (i.e., signal 906) and VTHERM_BIAS (908) then decrease to the wired charging bias voltage (i.e., signal 904) at 1.8V.

Figure 11:
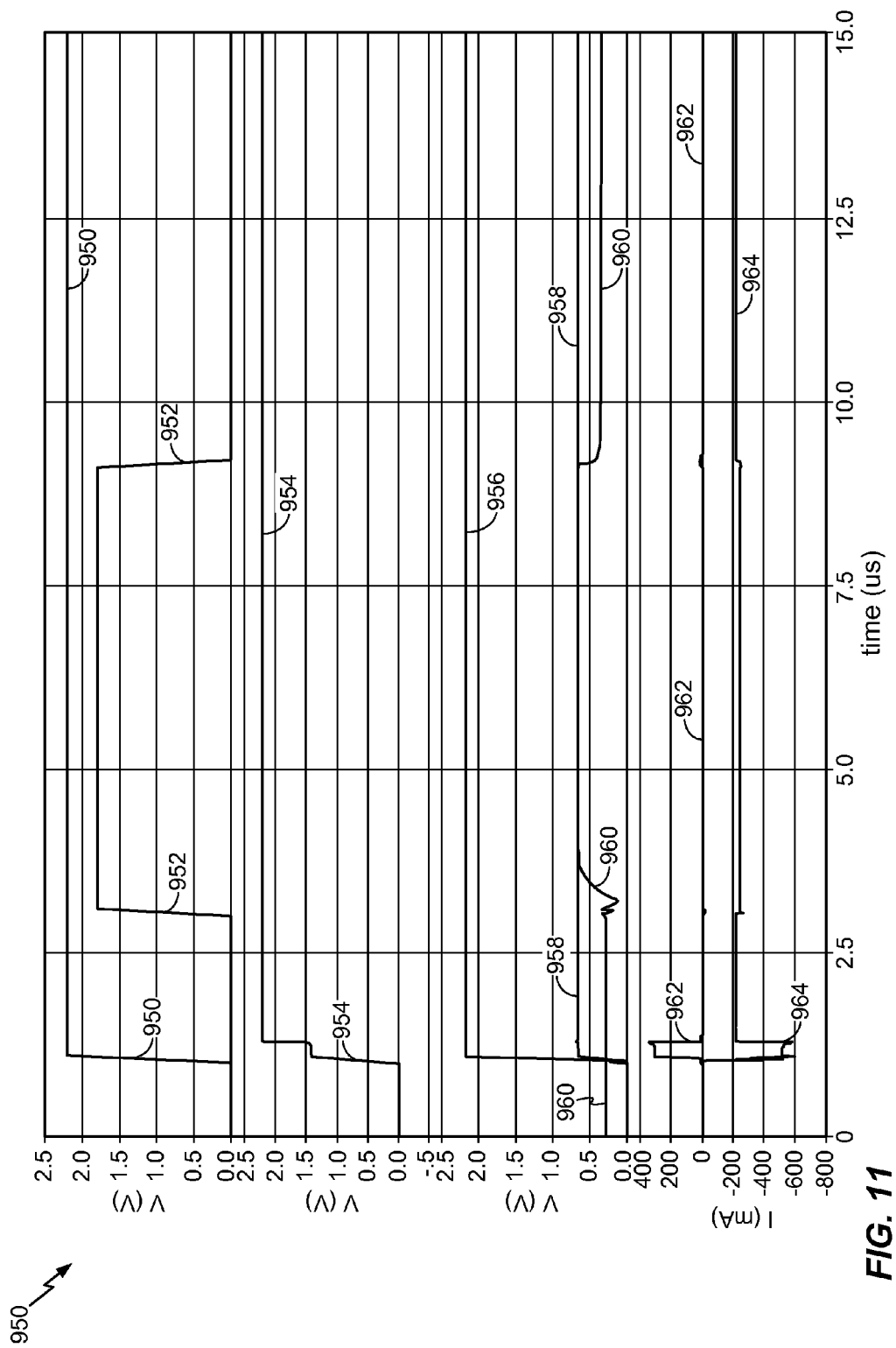
FIG. 11 is another timing diagram illustrating various voltage and currents within a receiver, according to an exemplary embodiment of the present invention.

FIG. 11 illustrates a timing diagram 940 illustrating various current and voltage levels of device 700 for the use case sequence in which a wired charging module (e.g., wired charging module 652) is on and wireless charging receiver (e.g., wireless charging receiver 654) toggles between an on and off position. Timing diagram 940 illustrates an automatic priority assignment of the interface (i.e., MUX 664 and maximum voltage selector 706). With reference to FIGS. 9 and 11, timing diagram 940 will now be described. Signal 952 represents a voltage level of the internal bias voltage and signal 950 represent a voltage level of the wired charging bias voltage ("WIRED_VTHERM_BIAS"). Further, signal 954 represents a voltage level voltage Vmax_out. Signal 956 represents a voltage level of the bias voltage ("VTHERM_BIAS") conveyed to thermistor 675. Signal 958 represents a voltage level of the thermistor voltage ("VTHERM_IN") conveyed to wired charging module 652 via link 710 and signal 960 represents a voltage level ("VTHERM_IN_BUF") output from buffer 714. Furthermore, signal 962 represents a current level supplied from regulator 704 to maximum voltage selector 706 and signal 964 represent a current level supplied from wired charging module 652 to maximum voltage selector 706. It is noted that wired charging bias voltage (i.e., signal 950) is higher at 2.2V than the internal bias voltage (i.e., signal 952) at 1.8V. Therefore, Vmax_out (i.e., signal 954) and VTHERM_BIAS (i.e., signal 956) do not change. Device 700 remains configured for a wired charging mode although wireless charging receiver 654 is turned on and off.

Figure 12:
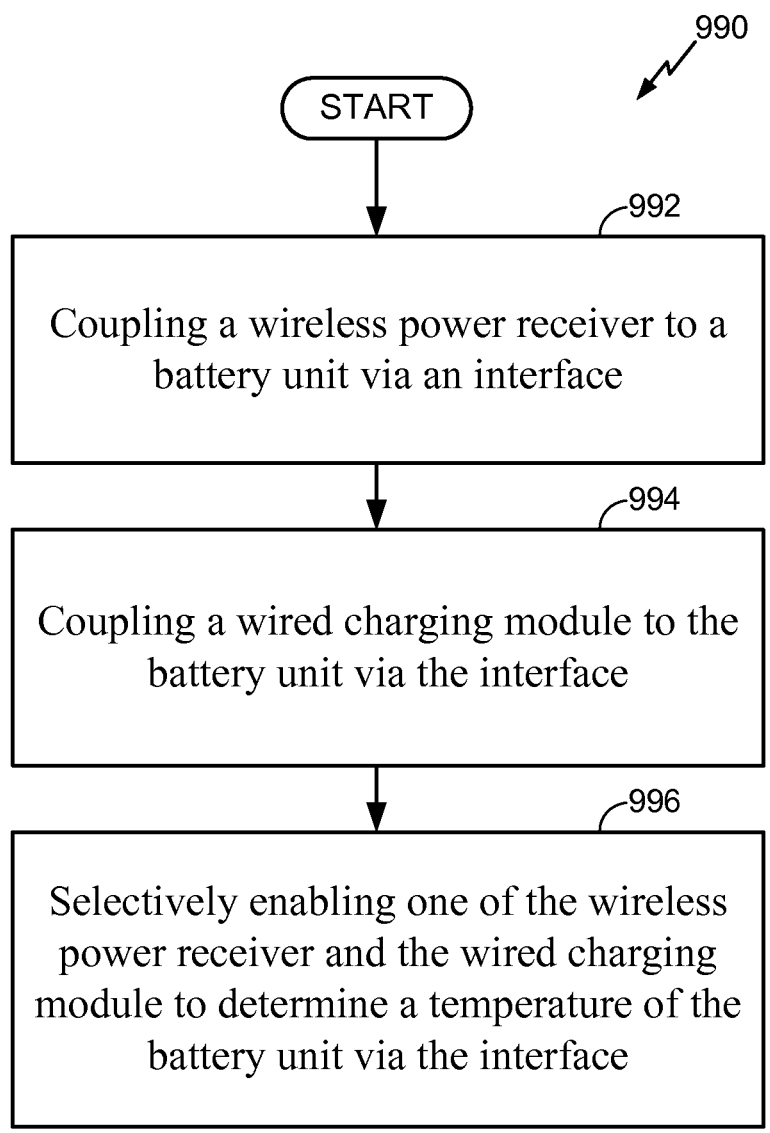
FIG. 12 is a flowchart illustrating a method, in accordance with an exemplary embodiment of the present invention.

FIG. 12 is a flowchart illustrating a method 990, in accordance with one or more exemplary embodiments. Method 990 may include coupling a wireless power receiver to a battery unit via an interface (depicted by numeral 992). Further, method 990 may include coupling a wired charging module to the battery unit via the interface (depicted by numeral 994). Method 990 may further include selectively enabling one of the wireless power receiver and the wired charging module to determine a temperature of the battery unit via the interface (depicted by numeral 996).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device for charging a battery unit, comprising:
a wireless power receiver configured to provide power to charge the battery unit in a wireless charging mode;
a wired charging module configured to provide power to charge the battery unit in a wired charging mode; and
an interface configured to couple to the battery unit and to selectively enable the wireless power receiver to determine a temperature of the battery unit during the wireless charging mode and to selectively enable the wired charging module to provide a bias voltage for determining the temperature of the battery unit during the wired charging mode.

2. A device for charging a battery unit, comprising:
a wireless power receiver;
a wired charging module operably coupled to the wireless power receiver; and
an interface configured to couple to the battery unit and to selectively enable one of the wireless power receiver and the wired charging module to determine a temperature of the battery unit, the interface configured to enable the wired charging module to bias a sensor of the battery unit and determine the temperature of the battery unit if a bias voltage from the wired charging module is greater than or equal to a bias voltage generated by the wireless power receiver.

3. The device of claim 2, the sensor comprising a thermistor.

4. The device of claim 1, the wireless power receiver comprising the interface.

5. The device of claim 1, the interface coupled to the wired charging module and configured to receive a bias voltage therefrom and to convey one of the bias voltage and an internal wireless receiver bias voltage to the battery unit.

6. The device of claim 1, further comprising a module for receiving a voltage output from a sensor of the battery unit and comprising an analog-to-digital converter coupled to a microcontroller or a digital comparator circuit to compare the voltage to one or more threshold levels to determine whether a temperature of the battery unit is within an acceptable range.

7. A device for charging a battery unit, comprising:
a wireless power receiver;
a wired charging module operably coupled to the wireless power receiver;
an interface configured to couple to the battery unit and to selectively enable one of the wireless power receiver and the wired charging module to determine a temperature of the battery unit; and
a module configured to receive a voltage output from a sensor of the battery unit and comprising an analog-to-digital converter coupled to a microcontroller or a digital comparator circuit to compare the voltage to one or more threshold levels to determine whether a temperature of the battery unit is within an acceptable range, the module further comprising a first switch for coupling a thermistor bias voltage to the analog-to-digital converter and a second switch for coupling a reference voltage to the analog-to-digital converter.

8. A device for charging a battery unit, comprising:
a wireless power receiver;
a wired charging module operably coupled to the wireless power receiver; and
an interface configured to couple to the battery unit and to selectively enable one of the wireless power receiver and the wired charging module to determine a temperature of the battery unit, the wireless power receiver comprising a first plurality of switches to configure a plurality of connections between the wired charging module, wireless power receiver, the interface, and the battery unit and a second plurality of switches to couple an analog-to-digital converter within the wireless power receiver to one of a reference voltage and a thermistor bias voltage.

9. The device of claim 1, the wireless power receiver comprising an array of comparators to compare a sensor voltage to one or more threshold levels to determine whether a temperature of the battery unit is within an acceptable range.

10. The device of claim 1, the interface comprising a multiplexer and a maximum voltage selector.

11. The device of claim 10, the multiplexer comprising one of a plurality of switches and a plurality of amplifiers.

12. The device of claim 1, the interface configured for selectively enabling one of the wireless power receiver and the wired charging module to bias a sensor of the battery unit to determine a temperature thereof.

13. A method for charging a battery unit, comprising:
coupling a wireless power receiver to the battery unit via an interface, the wireless power receiver configured to provide power to charge the battery unit in a wireless charging mode;
coupling a wired charging module to the battery unit via the interface, the wired charging module configured to provide power to charge the battery unit in a wired charging mode; and
selectively enabling the wireless power receiver to determine a temperature of the battery unit via the interface during the wireless charging mode and selectively enabling the wired charging module to provide a bias voltage for determining the temperature of the battery unit via the interface during the wired charging mode.

14. The method of claim 13, the selectively enabling the wired charging module comprising biasing a sensor associated with the battery unit with a bias voltage of the wired charging module and receiving a voltage output from the sensor at the wired charging module.

15. The method of claim 13, the selectively enabling the wireless power receiver comprising biasing a sensor associated with the battery unit with a bias voltage of the wireless power receiver and receiving a voltage output from the sensor at the wireless power receiver.

16. A method for charging a battery unit, comprising:
coupling a wireless power receiver to the battery unit via an interface;
coupling a wired charging module to the battery unit via the interface;
selectively enabling one of the wireless power receiver and the wired charging module to determine a temperature of the battery unit via the interface;
comparing a bias voltage generated by the wired charging module to another bias voltage generated by the wireless power receiver;
selecting the wired charging module to bias a sensor and sense the temperature of a battery unit prior to conveying power thereto if the bias voltage is greater than or equal to the another bias voltage; and
selecting the wireless power receiver to sense the temperature of the battery unit prior to conveying power thereto if the bias voltage is less than the another bias voltage.

17. The method of claim 13, the selectively enabling the wired charging module comprising coupling an output of the wired charging module to the battery unit and an output of the battery unit to the wired charging module via a multiplexer.

18. The method of claim 13, the selectively enabling the wireless power receiver comprising coupling a bias voltage internal to the wireless power receiver to the battery unit and an output of the battery unit to a monitoring circuit of the wireless power receiver via a multiplexer.

19. The method of claim 13, the selectively enabling the wired charging module comprising conveying a bias voltage to a thermistor within the battery unit to monitor a temperature thereof.

20. The method of claim 13, further comprising coupling a thermistor bias voltage to an analog-to-digital converter of the wireless power receiver while conveying a thermistor voltage to the analog-to-digital converter.

21. The method of claim 13, the selectively enabling the wireless power receiver comprising biasing a sensor of the battery unit via the interface to determine a temperature of the battery unit.

22. A device for charging a battery unit, comprising:
 means for coupling a wireless power receiver to the battery unit via an interface, the wireless power receiver configured to provide power to charge the battery unit in a wireless charging mode;
 means for coupling a wired charging module to the battery unit via the interface, the wired charging module configured to provide power to charge the battery unit in a wired charging mode;
 means for selectively enabling the wireless power receiver to determine a temperature of the battery unit via the interface during the wireless charging mode; and
 means for selectively enabling the wired charging module to provide a bias voltage for determining the temperature of the battery unit via the interface during the wired charging mode.

23. The device of claim 22, further comprising means for biasing a sensor associated with the battery unit with a bias voltage of the wired charging module and receiving a voltage output from the sensor at the wired charging module while the device is coupled to a wired charger.

24. The device of claim 22, further comprising means for biasing a sensor associated with the battery unit with a bias voltage of the wireless power receiver and receiving a voltage output from the sensor at the wireless power receiver during the wireless charging mode.

25. The device of claim 22, further comprising means for coupling a thermistor bias voltage to an analog-to-digital converter of the wireless power receiver while conveying a thermistor voltage to the analog-to-digital converter.

\* \* \* \* \*

UNITED STATES PATENT AND TRADEMARK OFFICE
CERTIFICATE OF CORRECTION

PATENT NO.         : 8,704,484 B2                                     Page 1 of 1
APPLICATION NO.    : 12/959253
DATED              : April 22, 2014
INVENTOR(S)        : Rosik et al.

It is certified that error appears in the above-identified patent and that said Letters Patent is hereby corrected as shown below:

In the Claims

Column 17 line 17, Claim 22, change "unit via an interface," to --unit,--.

Column 17 line 21, Claim 22, change "unit via the interface" to --unit,--.

Column 18 lines 2-3, Claim 22, change "unit via the interface" to --unit--.

Column 18 line 6, Claim 22, change "unit via the interface" to --unit--.

Signed and Sealed this
Seventh Day of October, 2014

Michelle K. Lee
*Deputy Director of the United States Patent and Trademark Office*